Feb. 15, 1927.

H. SWANSON

CHECK INDORSER MACHINE

Filed Oct. 25, 1922   8 Sheets-Sheet 5

1,617,874

Inventor:
Hjalmar Swanson
By Munday Clark & Carpenter Attys

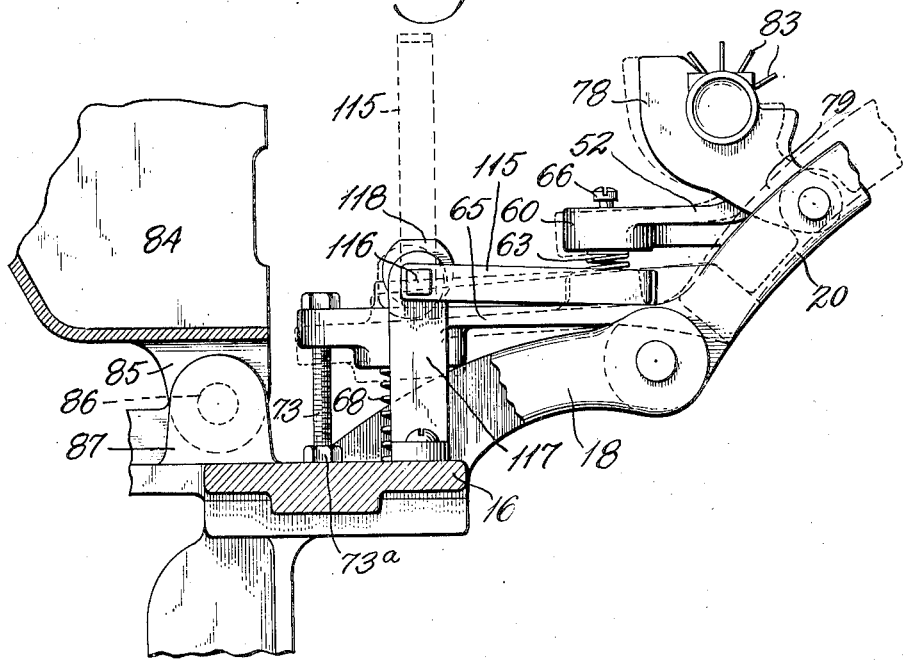
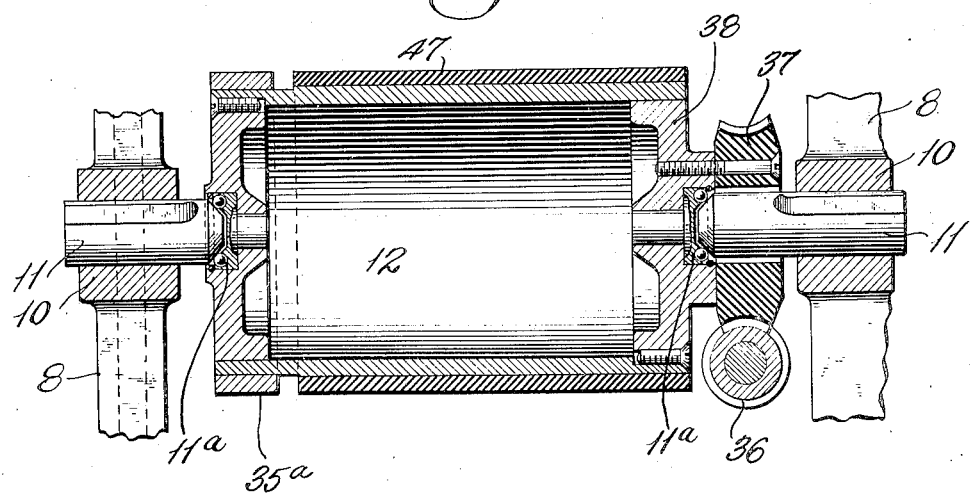

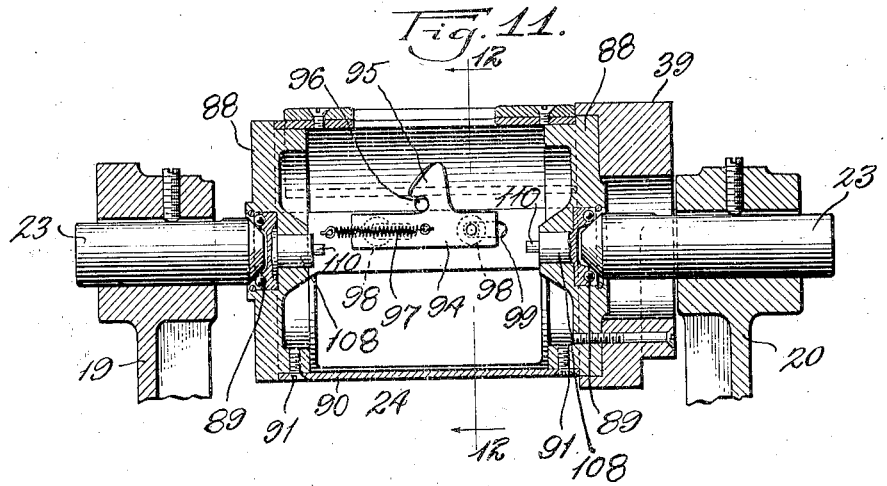
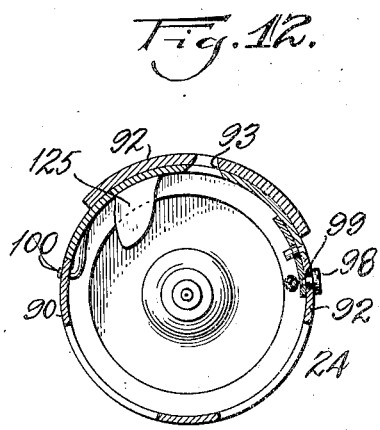
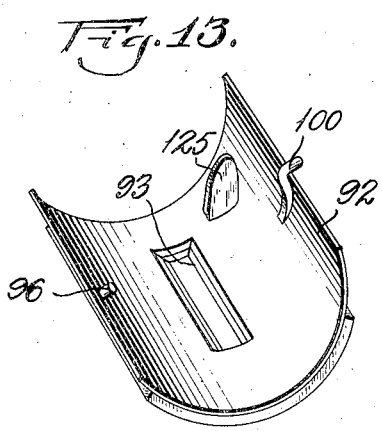
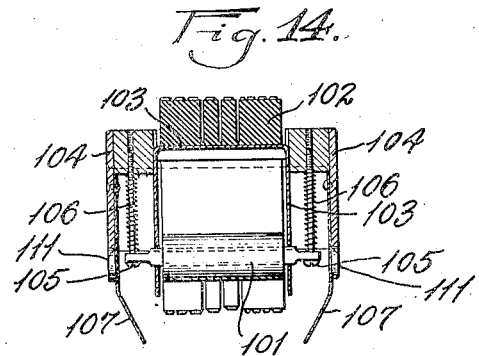

Patented Feb. 15, 1927.

1,617,874

UNITED STATES PATENT OFFICE.

HJALMAR SWANSON, OF CHICAGO, ILLINOIS, ASSIGNOR TO CUMMINS PERFORATOR COMPANY, OF CHICAGO, ILLINOIS, A CORPORATION OF ILLINOIS.

CHECK-INDORSER MACHINE.

Application filed October 25, 1922. Serial No. 596,728.

The invention relates to machines for indorsing or otherwise marking checks, or similar slips of paper and has for its objects; to provide a machine of the character described which is composed of few parts simply and compactly arranged whereby convenience and accuracy in the operation is insured; to provide a machine which is efficient and rapid in operation and which is designed to permit rapid feeding of the checks to the machine, and a rapid performance of the printing operation, without danger of error or spoiling the checks; to provide a machine which is automatic in operation and is actuated by the check which is inserted, with the result that the main working parts may remain idle except when being actually employed in the operation of indorsing a check; to provide a machine of the character described, the working parts of which are effectually enclosed and protected and yet are readily accessible to the operator when it is desired to inspect or adjust the same; to provide for ready and convenient adjustment of the machine without the use of special tools and which does not require a special knowledge of mechanics; to provide means whereby the check is accurately aligned with respect to the working parts during the operation of printing the indorsement on the check, with the result that accurate printing of the indorsement or other indicating mark on the check is insured.

In addition to the general objects recited above, the invention includes among its objects such other improvements and advantages in construction and operation as are found to obtain in the structures and devices hereinafter described or claimed.

In the accompanying drawings, forming a part of this specification, and showing, for purposes of exemplification, a preferred form and manner in which the invention may be embodied and practiced, but without limiting the claimed invention specifically to such illustrative instance or instances:

Figure 5:
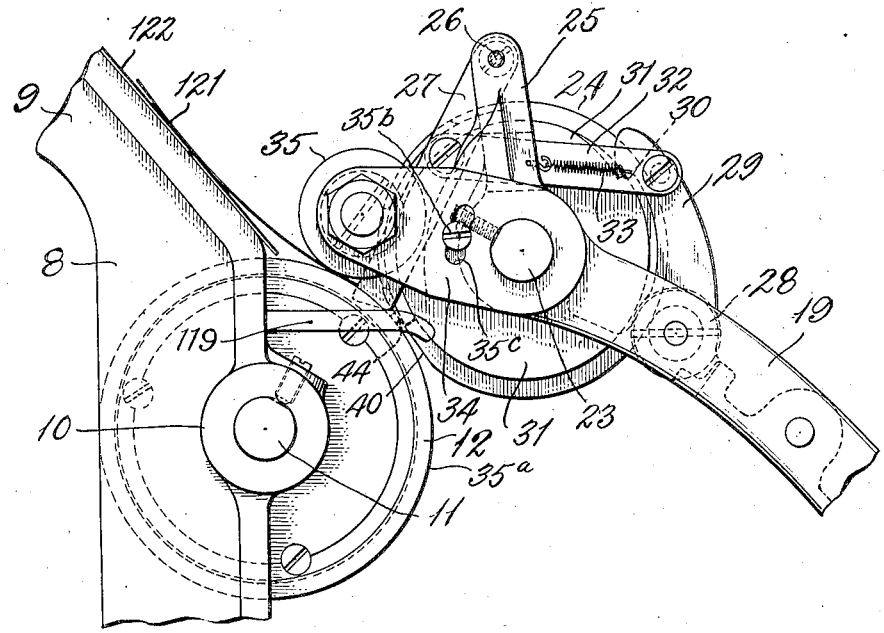
Figure 6:
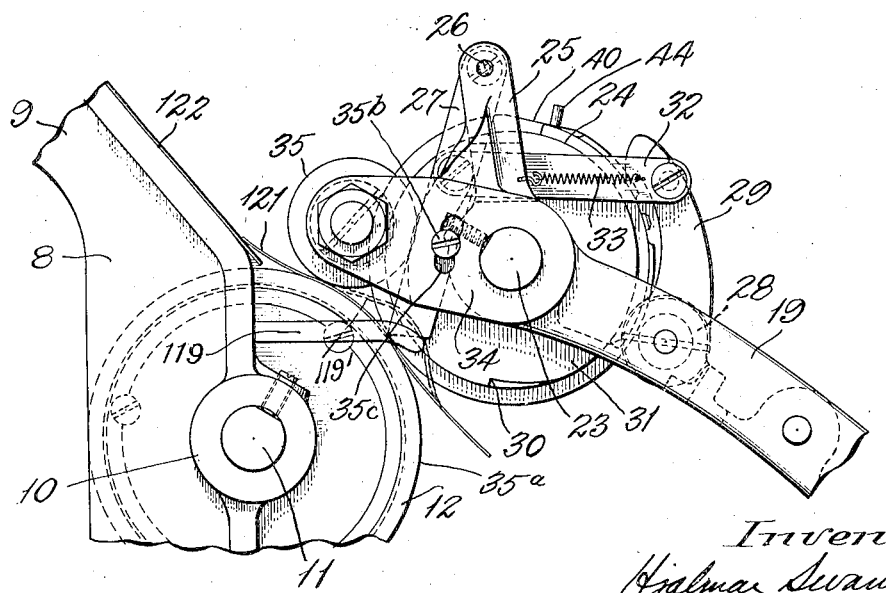
Figure 7:
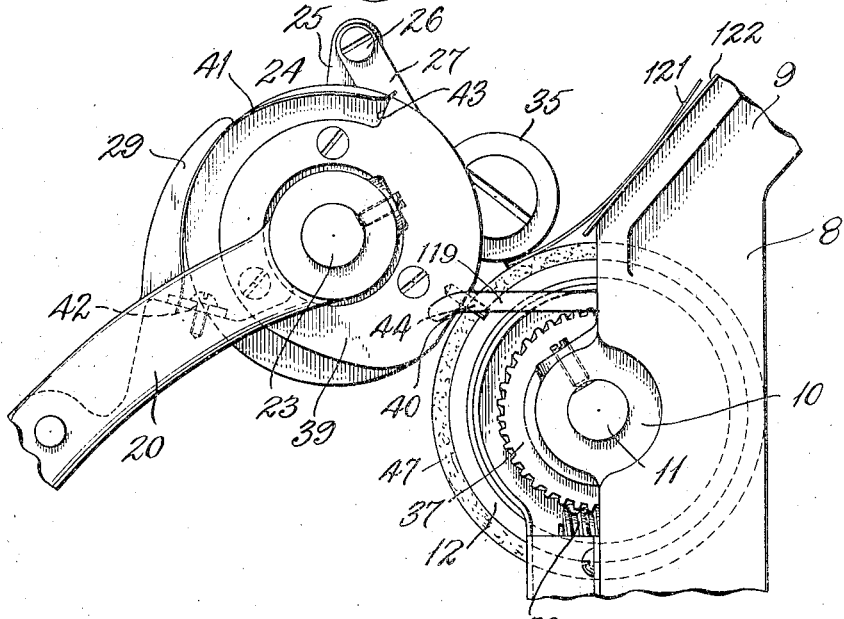
Figure 8:
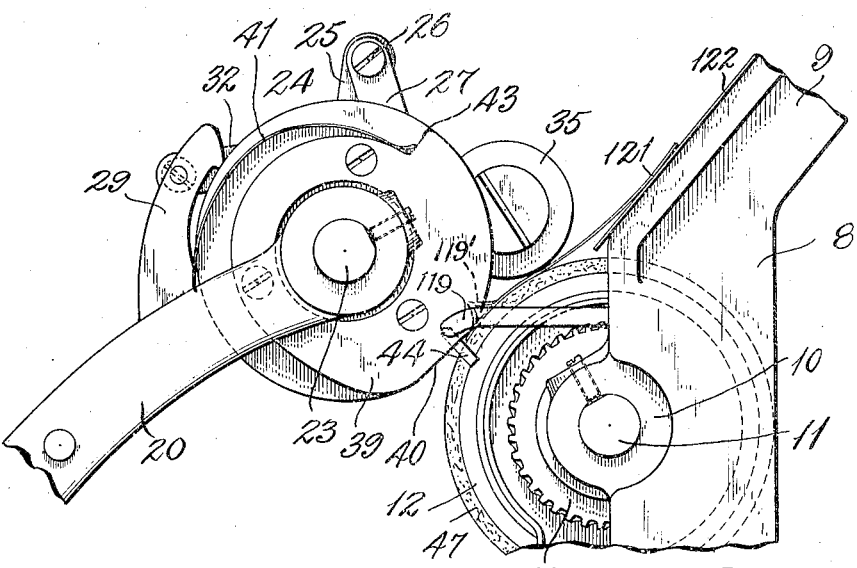

Figs. 5, 6, 7 and 8 are enlarged detailed views illustrating the operation of the check feeding and impression mechanism, Figs. 5 and 6 showing the operation on one side of the machine and Figs. 7 and 8 showing the operation on the other.

Figure 2:
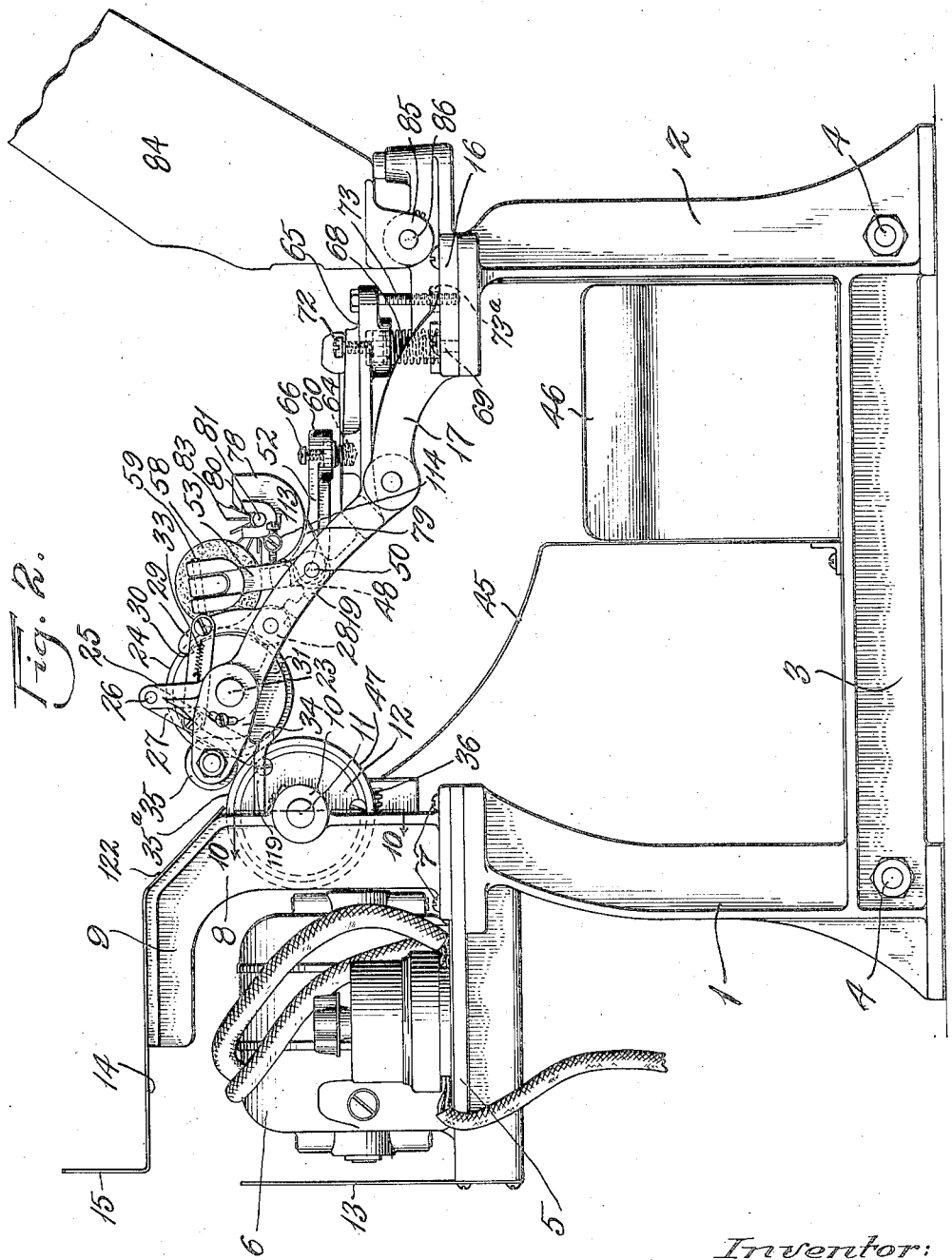
Fig. 2 is a side elevation of the same.

Fig. 9 is an enlarged detailed view partly in section, illustrating the mode of adjusting the ink spreading mechanism;

Fig. 10 is an enlarged transverse sectional view taken on line 10—10 of Fig. 2;

Fig. 11 is an enlarged transverse sectional view of the impression roller:

Fig. 12 is a transverse sectional view on line 12—12 of Fig. 11;

Fig. 13 is a perspective view of the impression roller cover and type carrier;

Fig. 14 is an enlarged detailed sectional view of the dating mechanism contained within the impression roller.

In the embodiment illustrated in the drawings the invention is incorporated in a machine that is especially designed for indorsing bank checks. For convenience, the present description will be confined to the illustrated embodiment of the invention in such a check indorsing machine; features of the invention are, however, susceptible of other valuable applications; hence, the invention is not confined in scope to the specific use and embodiment herein described as an illustrative example.

As best seen in Figs. 1, 2, 3 and 4 the machine is mounted on vertical standards 1 and 2 extending upwardly from opposite bases 3, and the latter are secured together by bolts 4. Secured to the upper portion of the standard 1 is a shelf or support 5 on which is mounted a motor 6; and suitably secured as by screws or bolts 7 to the said upper portion of the standard 1 is an upwardly extending bracket portion 8 having a central reinforcing web 9 and provided centrally thereof with aligned bosses 10 in which are mounted the trunnions 11 which support through the intermediary ball bearings 11ª the opposite ends of the driving or impression roller 12.

Figure 3:
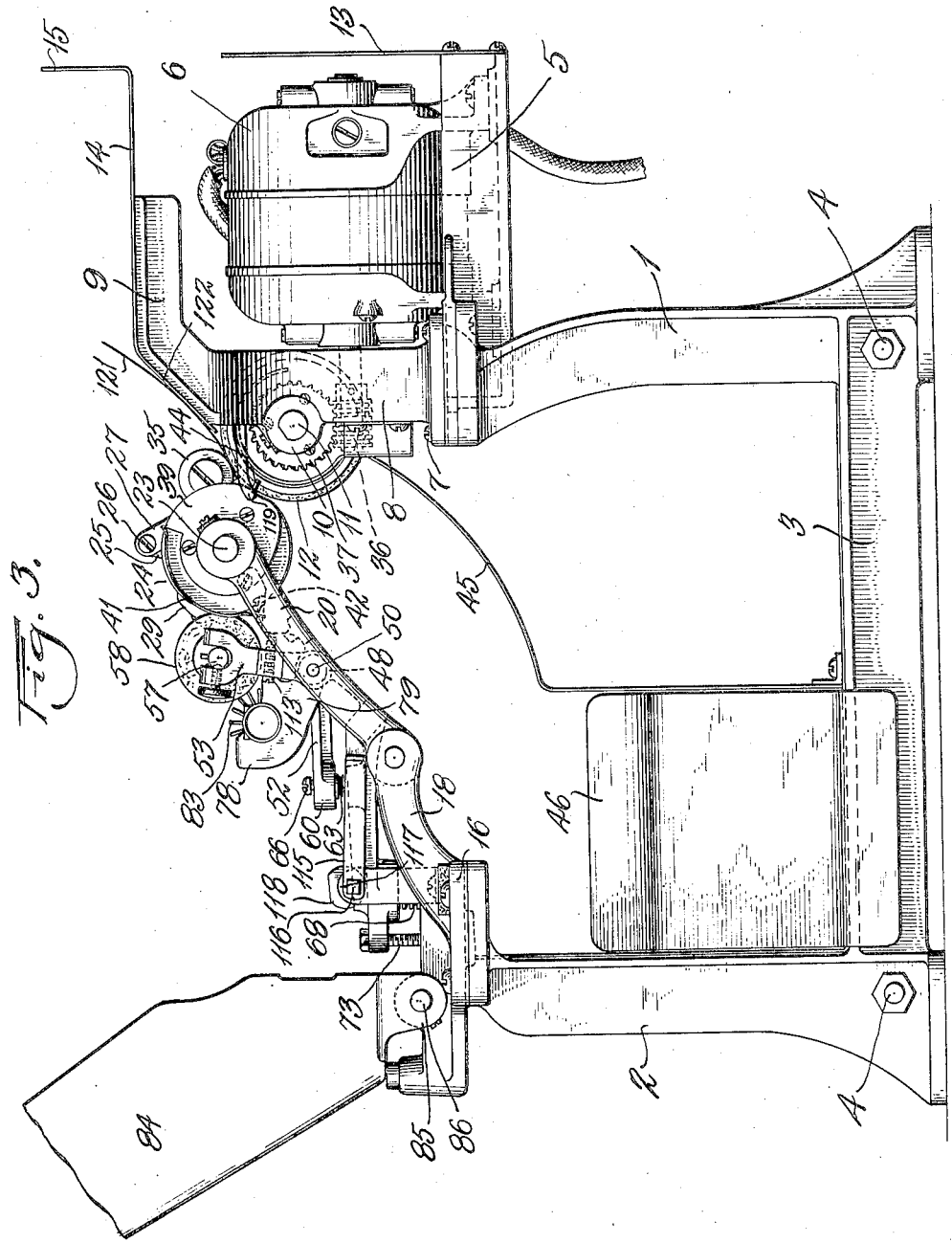
Fig. 3 is a view similar to Fig. 2 looking from the opposite side of the machine.

The inner ends of said trunnions 11 are provided with conical surfaces, as shown in Fig. 10, said surfaces constituting the inside raceways for the balls of the bearings. The motor 6 is suitably encased or enclosed within a protective housing formed by an upwardly extending plate 13 detachably secured to the supporting shelf or platform 5, and a similar substantially horizontal plate 14 secured to the bracket member 8. As best seen in Figs. 2 and 3 the outer end of the plate 14 is bent upwardly as at 15 to provide a supporting table on which the operator may stack the checks for subsequent feeding to the indorsing mechanism.

Secured to the horizontal upper portion of the standard 2 is a supporting bracket 16 provided near the ends thereof with a pair of extending arms 17 and 18, in the free ends of which are pivotally and adjustably mounted a second pair of bracket members 19 and 20. The members 19 and 20 are respectively mounted in the ends of the arms 17 and 18.

Mounted in suitable bosses in the free ends of the members 19 and 20 and extending therefrom are the supporting trunnions 23. These trunnions 23, through the intermediary of the ball bearings 29 of which their ends are fashioned to constitute the cones, support the opposite ends of the printing or type roller 24 and provide a substantially frictionless bearing construction for the said type roller. The member 19 is further provided at its outer end with an upwardly extending supporting arm 25. Pivotally mounted as at 26 in the upper end of said arm 25 is the depending trip lever 27, the lower end of which is positioned to be engaged and actuated by a check passing between the rollers 12 and 24 for the purpose of releasing the type roller to imprint an indorsement on the check in a manner presently to be described. The arm 19 is further provided intermediate its length and below the aforesaid supporting arm 25 with an inwardly extending boss or hub portion 28 in which is pivotally mounted a locking pawl 29 normally held in engagement with a notch or recess 30 formed in the periphery of the disk 31 secured to the type roller 24. A link 32 is pivotally secured at one end to the intermediate portion of the depending trip lever or trigger 27 and is similarly pivoted at its other end to the locking pawl 29. The latter is normally held in engagement with the notch 30 by a spring 33, secured at one end to the arm 25 and at its other end to that portion of the link 32 which extends rearwardly from the aforesaid arm 25. The engagement of the pawl with the disk 31 prevents the rotation of the latter and the type roller 24. In accordance with the invention the spring 33 is of very light power, whereby its action to hold the pawl 29 in locking engagement in the notch 30 may be overcome by the mere contact of a check fed against the lower end of the trigger 27.

As best seen in Figs. 1, 2, 5 and 6, a bracket member 34 is adjustably mounted on one end of the shaft 23 and carries at its outer end a feed roller 35, pivotally mounted on said bracket and in driving engagement with a disk 35ª which moves in unison with the driving or impression roller 12. When the type roller is in operation, the engagement of its printing surfaces with the check, and the pressure exerted thereby on the main driving or impression roller 12, will effect a slight lifting movement of the supporting arms 19 about the pivotal axis of their mounting in the bosses at the ends of the arms 17 and 18, with the result that the small feed roller 35 is lifted out of driving engagement with the aforesaid disk 35ª during the printing operation of the machine. Before the trigger or trip arm 27 is actuated to release the type roller, the small feed roller 35 serves to drive the check into contact with said trip arm. Adjustment of the arm carrying said small feed roller 35 is provided by a screw 35ᵇ which passes through a slot 35ᶜ in the arm 34 and is adapted to be tightened into engagement with a fixed part of the boss at the end of the arm 8 to retain the feed roller carrying arm 34 in adjusted position.

Power to the impression or drive roller 12 is imparted by means of a worm 36 on one end of the armature shaft of the motor 6, said worm meshing with and driving a worm gear 37 removably secured to one end of the central hub portion 38 of the feed roller 12.

As best shown in Figs. 7 and 8 the end of the type roller 24 opposite to the trigger mechanism has secured thereto an irregular or cam-shaped plate 39; and the whole type roller and the cam plate have a portion of their peripheries flattened as at 40. When the pawl 29 is in normal engagement with the notch 30, the flattened portion 40 of the cam plate and type roller is presented to the periphery of the continuously revolving drive roller 12, so that the type roller 24 is disengaged from the drive roller 12 and no movement is imparted thereto. A leaf spring 41 is suitably secured at one end, as at 42, to the arm 20 and bears at its free end against a shoulder 43 of the plate 39, tending to rotate the type roller 24 in a clockwise direction (Fig. 7) against the holding action of the pawl 29. The plate 39 is further provided on its flattened portion with a stop or guide pin 44 which projects downwardly beyond the periphery of and adjacent one end of the drive roller 12, the purpose of which is to temporarily arrest one end of the check, as the latter is fed between the rollers.

After passing between the rollers 12 and 24 the indorsed or cancelled checks are conveyed by gravity down a suitably arranged discharge incline 45 to the receptacle 46 provided for the purpose and supported near the base of the machine (Figs. 2 and 3).

The drive roller 12 is preferably provided on its periphery with a layer 47 of rubber, felt or other suitably resilient frictional material to facilitate the feeding of the checks between the rollers 12 and 24 and also the printing operation.

Formed integrally with the inner surfaces of the members or arms 19 and 20 is a pair of oppositely disposed bosses 48 and 49 in which is journaled on shafts 50 and 51 a supporting frame 52. The frame 52 is provided with a pair of upwardly extending arms 53 terminating in yokes forming bearings for the ends of the shaft 57 of the ink roller 58 the latter being removably secured as by pins 59 for free rotation within said yokes.

The roller 58 is provided with a circumferential layer of felt 59ª of any preferred ink-absorbing material. The rearwardly projecting tail of the frame 52 terminates in a socketed boss 60 constituting a seat for the short plunger 62 bearing against the upper end of a spring 63. The latter is seated in a socket 64 in the rearwardly extending portion 65 in the tail of the arms 19 and 20. A set screw 66 is threaded into the portion 60 of the frame 52 and bears at its lower end against the upper surface of the plunger 62. It will be seen by the arrangement described that any desired adjustment of the frame 52 may be effected to bring the ink roller 58 into the proper co-operating relation with the type roller 24.

Means for adjusting the arms 19 and 20 and roller 24 supported thereby with respect to the drive roll 12, are provided by a similarly arranged coil spring 68 bearing at its lower end against a plug 69 secured in the machine frame and having a tension adjustment at its upper end by a set screw 72 bearing against a plunger 70. The said plunger 70 enters a socket 71 in the tail 65. The movement of the type roller 24 toward the drive roller 12 is adjustably limited by a headed bolt 73 which passes through a hole 74 in the end of the tail 65 of the type roller supporting frame. The bolt is screwed into the frame of the machine whereby the head of the bolt may be adjusted to different heights. A nut 73ª may be tightened against the fixed frame to retain the bolt in adjusted position.

Figure 1:
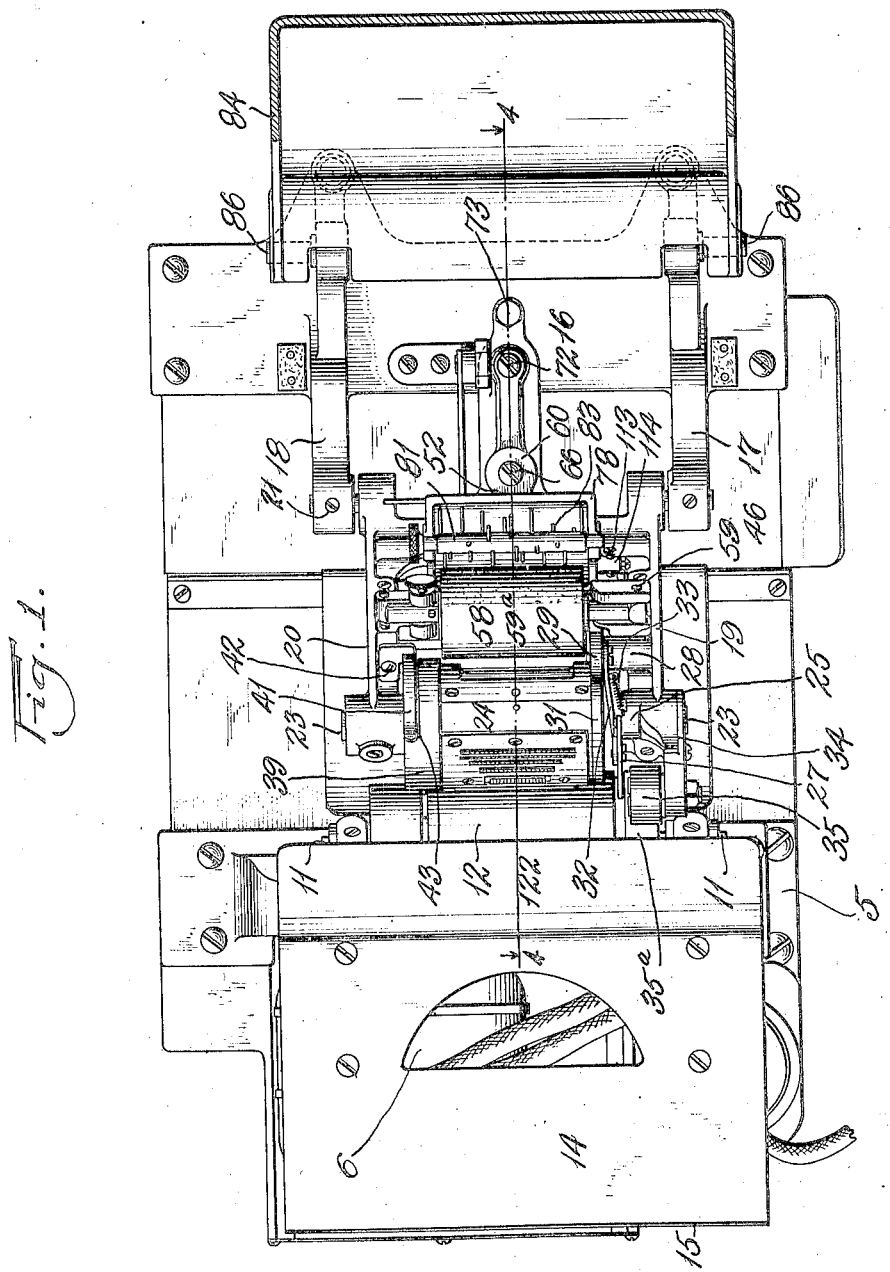
Fig. 1 is a plan view illustrating the preferred embodiment of my invention.

An ink receptacle 78 is provided having depending arms 79 at either end which are journaled on the stud shafts 50 and 51. The ends of the ink receptacle 78 are slotted as at 80 to provide a removable journal support for the shaft 81 of an ink spreader 82. The spreader 82 comprises a plurality of radially extending ink distributing pins 83 which, when the spreader is rotated, are immersed in the ink contained in the receptacle 78, and the ink deposited thereon is carried to and deposited by frictional contact on the roller 58 during the operation of the machine. As best seen in Fig. 1, the radially extending pins 83 of the ink spreader bear a staggered or spiral relation to one another about the hub of the shaft 81 with the result that the ink carried up from the receptacle 78 is widely distributed in small drops over the inking pad 59ª of the ink roller 58, and the ink so distributed is spread by capillary attraction over the entire inking surface of said roller. This arrangement insures an even distribution of the ink over the surface 59ª and prevents an over-supply of ink thereto.

The ink spreader 81 is held in constant engagement with the inking roll 58 by means of a coil spring 112 seated in and engaging opposed sockets in the ink receptacle 78 and rearwardly extending tail of the frame 52. This tension may be varied to any desired extent by adjusting the set screw 113 having threaded engagement in a boss 114 provided at one end of the ink receptacle 78 and bearing at its free end against the frame 52.

A suitable protective casing for the various mechanisms above described is provided in the form of a removable housing or cover 84 having ears 85 which are hinged by pins 86 to ears 87 on the frame of the machine. Access to the interior of the machine may be had by swinging the cover 84 up on the hinge mechanism above described.

The body 90 of the type cylinder is suitably fixed to the end plates 88 as at 91. The roller 24 is further provided with a type plate 92 carrying the fixed type on its outer surface and having a substantially rectangular aperture 93 through which the changeable data to be printed on the check projects when said plate 92 is in place on the type roller. A sliding locking plate 94 mounted within the body 90 of the type roller is provided with a hook 95 held normally by a spring 97 in engagement with a pin 96 projecting from the interior of the removable type plate. When it is desired to detach the type plate from the body the operator moves the knobs 98 projecting from the slide 94 longitudinally in the slots 99, thus releasing the hook 95 from engagement with the pin 96 of the type plate. This permits the type plate to be lifted bodily from the type roller. In the operation of removing the plate 92 from the body of the type roller, the plate is swung backwardly to withdraw the retaining pin 100 from a socket in the body of the type roller. The type plate may be replaced by simply inserting pin 100 in the hole in the body of the type roller and snapping or pressing the type plate into position.

A depending ear or lug 125 may be provided on the inner surface of the type plate 92 and is adapted to project through a suitably located aperture in the body 90 of the type cylinder, to assist in locating the plate on the cylinder and which ear member serves as a guide when the plate is swung backwardly to obtain access to the interior of the type cylinder.

The changeable data, such as a date, is illustrated in Fig. 14 and consists preferably in the usual form of rubber date-stamp which is revolved over a central roller 101 and comprises the bands provided with the usual dating type dates. The bands are mounted to move over the supporting bracket 103 contained within the side members 104 and suitably tensioned and yieldably supported by screw pins 105 and coil springs 106. The pins 105 are screwed into inwardly projecting portions of the side members 104, and provide means whereby the date bands may be adjusted to increase or decrease the pressure or impression of the date type on the check. The lower ends of the side members 104 are preferably bent inwardly as at 107 to form a protective closure for the dating mechanism. This structure as an entirety is mounted upon trunnions 108 and 109 carried by the annular end portions 88 of the type roller, which trunnions are provided with projecting pins 110 adapted to seat in opposing apertures 111 in the lower portion of the side members 104 of the date supporting member.

Figure 4:
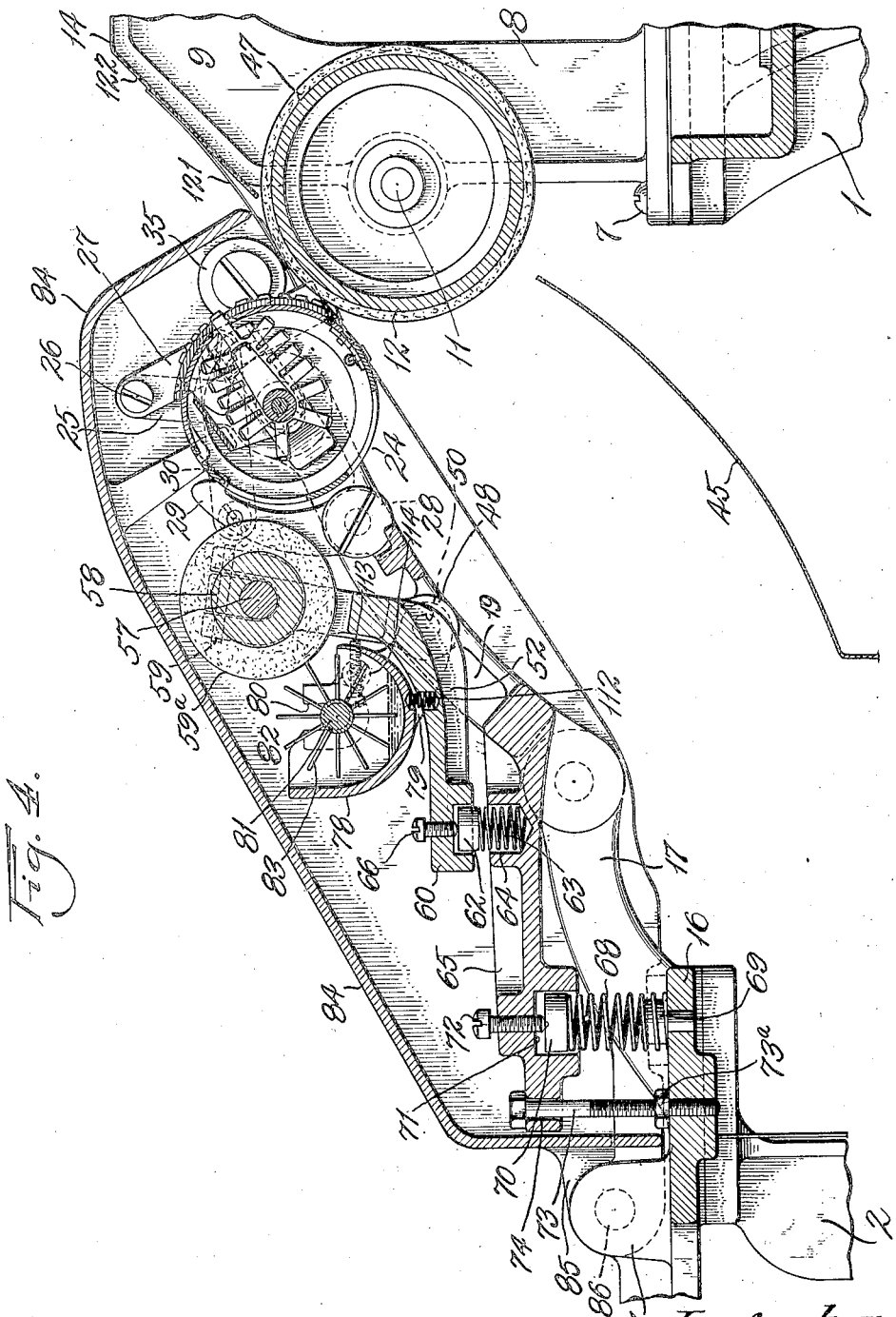
Fig. 4 is an enlarged longitudinal vertical sectional view on line 4—4 of Fig. 1.

Referring to Figs. 4 and 9, when it is desired to move the type roller away from the impression or driving roller, I have provided a hand lever 115 pivoted at 116 to an upstanding ear or support 117 rigidly mounted on the frame of the machine. The stud shaft on which the lever 115 is pivoted has provided on its inner end an eccentrically mounted cam 118. When the lever 115 is swung to vertical position (indicated by dotted lines in Fig. 9) the eccentric cam 118 is rotated on its axis and its periphery bears against the rearwardly extending tail forcing the same down against the compression of the coil spring 68 and swinging the arms 19 and 20 on their axes with the result that the type roller is moved away from the drive or impression roller.

Projecting from the drive roller support, on the opposite sides of the latter and extending towards and beyond the periphery of the type roller are guide members or fingers 119. These fingers serve to straighten out crumpled checks or checks having creases from folding and to prevent such checks from taking an erratic course in the gravity drop from between the drive or impression roller and the type roller to the hopper. Sometimes a crumpled or creased check may be deflected sufficiently to turn over or to stand on edge against the wall of the hopper. These fingers 119 act to guide the check and by slightly creasing or crimping the check in the right direction, i. e., oppositely from the creases resulting from the folding, cause it to fall correctly. The checks are fed into the machine laterally or sideways with their long edges parallel to the axes of the cooperating rollers and should the checks be creased from folding they would tend to take the form of an inverted U, thereby providing an air pocket which would be likely to cause such check to take an erratic course in its gravity drop. Such U shape formation would provide two or more upstanding sides which would permit such checks to stand on their folded side edges or as an inverted U on the inclined surface 45. The fingers 119 tend to bend the folded portions of the check back upon themselves and at right angles to the lines of fold as shown in dotted lines 119′ in Figs. 6 and 8.

The operation of the mechanism above described is as follows: A check 121 or other slip of paper to be printed or indorsed is placed on the feed incline 122 of the sheet metal support 14 and one end is fed between the continuously rotating drive roller 12 and the feed roller 35. The other end of the check is brought into engagement with the guide or stop pin 44 which serves to maintain the check in proper alignment for the impression it is about to receive. The other end of the check, as it is being fed between the rollers above described contacts with the trigger 27. As before stated the trigger and its connected mechanism is mounted so as to be sensitive and responsive to slight pressure. The action of the check moving between the drive and feed rolls forces the lower end of the trigger 27 inwardly and the link 32 forces the locking or holding pawl 29 out of locking engagement with the depression or notch 30 on the end of the type roller. When the pawl is released the leaf spring 41 on the other end of the type roller forces the flat circumferential portion of the cam plate 39 and the roller in a clockwise direction (Fig. 7) away from the revolving feed roller 12 and the cylindrical surface of the said cam plate and type roller 24 is engaged by said feed roller, to establish a driving connection between the two rollers, with the result that the required impression is made on the check as it passes between the rollers 12 and 24. The indorsed check drops upon the discharge incline 45 from which it is conveyed by gravity to the receptacle 46. Immediately upon passage of the check between the rollers the pawl 29 is again caused by the tension spring 33 to contact with the surface of the annular disk 31 fixed on one end of the type roller and the latter is prevented from further rotation when the notch or depression 30 in said end disk 31 has completed one revolution at a time when the flat portion of the cam plate 39 and the type roller is in normal position adjacent the feed roller 12 as shown in Fig. 7 and the rollers are in position for the insertion of another check. It will be seen from the foregoing that the operation of this intermittent feed mechanism is automatic and entirely controlled by the check or sheet of material inserted between said rollers.

After the type has made the desired impression on the check it passes around and revolves the inking roller 58 receiving a fresh supply of ink on the type surface to be used for the following check on the next ensuing revolution of the type roller.

The intermittent rotation of the type roller 24 and ink roller 58 causes a similar intermittent rotation of the ink spreader 81 which feeds and widely distributes a fresh supply of ink to the inking roller thus insuring at all times adequate and continued ink supply to the type surfaces.

The invention as hereinabove set forth may be variously embodied within the scope of the claims hereinafter made.

I claim:

1. In a check indorsing machine, in combination: a drive roller, means for driving said drive roller continuously, a type roller adapted to cooperate with said drive roller, said type roller being held normally out of driving engagement with said drive roller, check actuated means, and spring means releasable by said check actuated means to establish a driving connection between said type roller and said drive roller to impress said check as it is fed between said rollers, said check actuated means being automatically operative to disengage said driving connection after said check has been impressed and fed between said rollers.

2. In a check indorsing machine, in combination: a drive roller, means for driving said drive roller continuously, a type roller adapted to cooperate with said drive roller, said type roller being mounted for rotation on a central axis which axis is centrally mounted with respect to said type roll, means for holding said type roller normally out of driving engagement with said drive roller, normally stationary means operable to impart a partial rotation to said type roller when said type roller is released from said holding means by a check to establish a driving connection between said type roller and said drive roller to impress said check as it is fed between said rollers.

3. A printing machine comprising an impression device, feed mechanism for conveying an article to be printed into operative position with respect to said impression device and spring means operable to impart a partial rotation to said impression device, and means operable to prevent operation of said spring means, and operable when released by said article to permit operation of said spring means.

4. A printing machine comprising an impression device, feed mechanism for conveying an article to be printed into operative position with respect to said impression device, and spring actuated means holding the impression device and releasable by said article to cause the impression device to engage and be rotated by said feed mechanism.

5. A printing machine comprising an impression device, feed mechanism for conveying an article to be printed into operative position with respect to said impression device, means for preventing operation of said impression device and releasable by said article to permit operation of said impression device, and means movable only upon said releasing by said article to impart an initial driving impulse to said type roller.

6. In a check indorsing machine, in combination: means for feeding checks, means for continuously operating said check feeding means, a support, means for printing checks adjustably mounted on said support and adapted to be brought into cooperative engagement with said check feeding means, means mounted on said support normally holding against rotation said printing means, spring actuated means mounted on said support and tending to rotate said printing means, inking means mounted on said support adapted to cooperate with said printing means, and means actuated by a check for disengaging said holding means to permit the actuation of said spring actuated means, whereby the cooperative engagement of said printing means with said feeding means to feed and print said checks is effected.

7. In a check indorsing machine, in combination: means for feeding checks, means for continuously operating said check feeding means, a support, means for printing checks adjustably mounted on said support and adapted to be brought into cooperative engagement with said check feeding means, means mounted on said support normally holding against rotation said printing means, spring actuated means mounted on said support and tending to rotate said printing means, inking means mounted on said support adapted to cooperate with said printing means, ink spreading means mounted on said support adapted to cooperate with said inking means, and means actuated by a check for disengaging said locking means to permit the actuation of said spring actuated means to permit the cooperative engagement of said printing means with said feeding means to feed and print said checks.

8. A printing machine comprising an intermittently operable impression device, feed mechanism for conveying an article to be printed into operative position with respect to said impression device, and for actuating said impression device and spring actuated means operable to partially rotate said impression device and means holding the impression device and releasable by said article for establishing a driving connection between said feed mechanism and said impression device.

9. In a check indorsing machine, in combination: a drive roller adapted to be continuously driven, a type roller adapted to cooperate with said drive roller and held normally out of driving engagement therewith, an inking roller rotated only when engaged by the type of said type roller, an ink spreader adapted to receive ink from a source of ink supply and to continuously engage said inking roller and distribute ink thereon, said ink spreader being moved by said inking roller only when said inking roller is rotated and means actuated by a check to establish a driving connection between said type roller and said drive roller.

10. In a check indorsing machine, in combination: a continuously driven drive roller, a type roller adapted to cooperate therewith, a support for said type roller, a cam mounted on one end of said type roller and having a portion of its periphery adapted to engage said drive roller, a spring mounted at one end on said support and engaging at its other end a portion of said cam and normally tending to rotate the same, an arm secured to the other end of said type roller and pivotally mounted on said support, said arm having an extended portion adapted to be engaged by a portion of a check, a pawl pivotally mounted on said support and engaging said type roller to normally prevent same from rotating, a link connecting said pawl with said extended portion, and a spring connecting said arm with said link to normally hold said pawl in locking engagement with said type roller, whereby said type roller is rotated on its axis to establish a driving connection with said drive roller when said pawl is disengaged from said type roller by the pressure of said check against said extended portion of said arm.

11. A check indorsing machine comprising in combination: a continuously driven drive roller, a check indorsing roller adapted to cooperate with said drive roller, and means holding the check indorsing roller and releasable by a check, a cam operatively associated with said indorsing roller; a spring riding said cam and operable on said cam to cause the check indorsing roller to engage and be rotated by said drive roller when said holding means has been released by a check.

12. In a check indorsing machine, in combination: a drive roller, means for driving said drive roller continuously, a type roller normally held out of contact with said drive roller and adapted to be moved into driving engagement with said drive roller, and means actuated by a check to move said type roller into contact with said drive roller to establish a driving engagement and impress said check as it is fed between said rollers, said check actuated means being automatically operative to disengage said driving engagement after said check has been impressed and fed between said rollers.

13. In a check indorsing machine, in combination: a continuously driven drive roller, a type roller adapted to cooperate with said drive roller, said type roller being held normally out of contact with said drive roller, means actuated by a check to establish by contact a driving connection between said type roller and said drive roller to impress said check as it is fed between said rollers, said check actuated means being automatically operative to disengage said driving connection after said check has been impressed and fed between said rollers, and means carried by said type roller to insure the centering of said check with respect to said drive roller and said type roller.

14. In a check indorsing machine, in combination: a continuously driven drive roller, a type roller adapted to cooperate with said drive roller, said type roller being held normally out of contact with said drive roller, means actuated by a check to establish by contact a driving connection between said type roller and said drive roller to impress said check as it is fed between said rollers, said check actuated means being automatically operative to disengage said driving connection after said check has been impressed and fed between said rollers, and a pin carried by said type roller and engaged by said check to insure the centering of said check with respect to said drive roller and said type roller before said driving connection has been established.

15. In a check indorsing machine, in combination: a continuously driven main drive roller, a type roller adapted to cooperate with said drive roller, said type roller being held normally out of driving engagement with said drive roller, means cooperating with said type roller and actuated by a check to establish a driving connection between said type roller and said drive roller, means carried by said type roller to insure the centering of said check with respect to said drive roller and said type roller and a feed roller cooperating with said drive roller and adapted to feed said check to a position in alinement with said check centering means and also to permit the engagement of said check with said check actuating means, whereby the check is impressed and fed between said rollers.

16. In a check indorsing machine, in combination: a continuously driven drive roller, a cooperable type roller held normally out of contact and driving engagement therewith, check-actuated means to establish by contact such driving connection, and feeding means operative prior to said driving connection to advance a check into engagement with said check-actuated means, said check actuated means being automatically operative to disengage said driving engagement after said check has been impressed and fed between said rollers.

17. In a check indorsing machine, in combination: a drive roller, means for driving said drive roller continuously, a type roller adapted to cooperate with said drive roller, a pawl mounted on said machine and normally holding said type roller out of driving engagement with said drive roller, trigger mechanism cooperating with said type roller and actuated by a check to disengage said holding pawl, and spring actuated means mounted on said machine and cooperating with said type roller to automatically establish a driving connection between said type roller and said drive roller when said holding pawl has been disengaged by the actuation of said trigger mechanism.

18. In a check indorsing machine, in combination: a drive roller, means for driving said drive roller continuously, a type roller adapted to cooperate with said drive roller, a pawl mounted on said machine and normally holding said type roller out of driving engagement with said drive roller, clutch mechanism cooperating with said type roller and actuated by a check to disengage said holding pawl, and spring actuated means mounted on said machine and cooperating with said type roller to automatically establish a driving connection between said type roller and said drive roller when said holding pawl has been disengaged by the actuation of said clutch mechanism.

19. In a check indorsing machine, in combination: a drive roller, means for driving said drive roller continuously, a type roller adapted to cooperate with said drive roller, a pawl mounted on said machine and normally holding said type roller out of driving engagement with said drive roller, trigger mechanism cooperating with said type roller and actuated by a check to disengage said holding pawl, and spring actuated means mounted on said machine and cooperating with said type roller to automatically establish a driving connection between said type roller and said drive roller when said holding pawl has been disengaged by the actuation of said trigger mechanism, said holding pawl being automatically operative to disengage said driving connection after said check has been impressed between said type roller and said drive roller.

20. In a check indorsing machine, in combination: a drive roller, a type roller cooperable therewith, releasable means for holding the type roller out of engagement with the drive roller, and spring actuated means operable on release of said holding means to impart an initial driving impulse to said type roller to establish such driving connection.

21. A check indorsing machine, comprising in combination: an impression device, means for feeding the reverse side of a check to said impression device, and means for flexing and flattening a crumpled check while it is being impressed by said impression device.

22. In a check indorsing machine in combination: a drive roller, means for driving said drive roller continuously, a driven roller adapted to cooperate with and be driven by said drive roller, said driven roller being normally held out of driving engagement with said drive roller and having an antifriction rotary mounting in the frame of the machine, the driving engagement between said rollers being effected by a rotary movement of said normally stationary driven roller, means for normally holding said driven roller out of engagement with said drive roller, and means cooperating with said holding means for effecting the driving engagement between said rollers.

In testimony whereof I have hereunto set my hand.

HJALMAR SWANSON.